(12) United States Patent
Miller et al.

(10) Patent No.: US 7,570,661 B2
(45) Date of Patent: Aug. 4, 2009

(54) SCRIPT-BASED PARSER

(75) Inventors: Olaf A. Miller, Bellevue, WA (US);
David N. MacDonald, Mercer Island, WA (US); James J. McNelis, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 613 days.

(21) Appl. No.: 11/153,530

(22) Filed: Jun. 14, 2005

(65) Prior Publication Data

US 2006/0280178 A1 Dec. 14, 2006

(51) Int. Cl.
*H04J 3/22* (2006.01)
(52) U.S. Cl. .................. 370/469; 370/474; 370/392
(58) Field of Classification Search .................. None
See application file for complete search history.

(56) References Cited

U.S. PATENT DOCUMENTS

| | | | | |
|---|---|---|---|---|
| 6,115,393 A | * | 9/2000 | Engel et al. | 370/469 |
| 6,741,591 B1 | * | 5/2004 | Kaldani et al. | 370/389 |
| 7,177,930 B1 | * | 2/2007 | LoPresti | 709/224 |
| 7,187,694 B1 | * | 3/2007 | Liao | 370/474 |
| 2002/0157041 A1 | * | 10/2002 | Bennett et al. | 714/43 |
| 2002/0181507 A1 | * | 12/2002 | Jones | 370/474 |
| 2002/0186697 A1 | * | 12/2002 | Thakkar | 370/401 |
| 2006/0039372 A1 | * | 2/2006 | Sarkinen et al. | 370/389 |

\* cited by examiner

*Primary Examiner*—Duc C Ho
(74) *Attorney, Agent, or Firm*—Wolf, Greenfield & Sacks, P.C.

(57) ABSTRACT

A method, apparatus, and computer-readable medium for analyzing network data streams with parsers generated using script based parsers is provided. The script based parsers are used to analyze the captured frames of a network data stream and identify conversations in the frames. The script based parsers are written in a language that describes network protocols. A script interpreter interprets script to build a parser in the memory of a computing device. A parsing engine uses the protocol parsers stored in memory to parse frames. A capture engine captures frames for parsing and frames are organized into conversations. The parsing of frames is optimized by substituting data structure sizes for data structures that are not of interest in a particular parser.

12 Claims, 13 Drawing Sheets

|   | DATA |   |
|---|------|---|

| AH | DATA |
|----|------|

| PH | AH | DATA |
|----|----|------|

| SH | PH | AH | DATA |
|----|----|----|------|

| TH | SH | PH | AH | DATA |
|----|----|----|----|------|

| NH | TH | SH | PH | AH | DATA |
|----|----|----|----|----|------|

| DH | NH | TH | SH | PH | AH | DATA | DT |
|----|----|----|----|----|----|------|----|

| PH | DH | NH | TH | SH | PH | AH | DATA | DT |
|----|----|----|----|----|----|----|------|----|

*Fig. 1C.*
PRIOR ART

```
DATATYPE MACADDRESS
{
    SIZE = 6;
    DISPLAYFORMAT =
    FORMATSTRING("%02X-%02X-%02X-%02X-%02X-%02X",
        THIS[0],THIS[1],THIS[2],THIS[3],THIS[4],THIS[5]);
};

PROTOCOL ETHERNET = "ETYPE = " + ETYPE.TOSTRING
{
    [PAIR = ADDRESS, DESTINATIONHARDWAREADDRESS]
    MACADDRESS DESTINATIONADDRESS
    {
        BYTE ADMINISTRATIVETYPE:1;
        BYTE ADDRESSTYPE:1;
    };
    [PAIR = ADDRESS, SOURCEHARDWAREADDRESS]
    MACADDRESS SOURCEADDRESS
    {
        BYTE NOTUSED:1;
        BYTE ADDRESSTYPE:1;
    };
    [NEXTPROTOCOL]
    WORD ETYPE = PROTOCOLTYPETABLE(THIS);

SWITCH(ETYPE)
    {
        CASE 0X800: IPV4 IPV4PROTOCOL;
        CASE 0X806: ARP ARPPROTOCOL;
    };
};
```

*Fig. 9.*

SCRIPT-BASED PARSER

FIELD OF THE INVENTION

The present invention relates to data analysis, and more particularly, to analyzing network data streams.

BACKGROUND OF THE INVENTION

A network data stream is composed of a plurality of frames. A frame is a logical unit of data organized specifically for transmission. In the prior art, a frame may also be referred to as a packet, block, or cell. In a network data stream, a complete frame is composed of a header followed by a payload that is followed by a trailer. A header contains a flag bit, or set of bits, to indicate the beginning of the frame followed by control data and address data such as synchronizing bits, address of the destination or target device, address of the originating device, length of frame, and so on. A payload comprises the data to be transmitted and, depending on the transmission protocol, may be of fixed or variable length. A trailer contains error detection and correction bits and a set of bits to indicate the end of the frame. Frames are assembled by the sending computer and placed in a network data stream to be transmitted to a receiving computer via a network. Frames are extracted from network data stream by the receiving computer. The receiving computer extracts and uses the payload of the frame.

The assembly, transmission, and extraction of frames and extraction of payloads from frames are governed by standard sets of rules called protocols. A network protocol, i.e., protocol, is a set of rules used by computers to communicate via a network. Protocols enable computers attempting to exchange data to "understand" one another. Protocols are sometimes described as "languages;" however, a protocol is more like the syntax of a language, i.e., the order in which words are put together, than the language itself. In order for two computers to communicate, each computer must understand the protocols used by the other computer.

To ensure that computers understand protocols used by other computers, standard protocols have been developed. Organizations such as the International Standards Organization (ISO) are charged with the definition, control, and publishing of the specifications of standard protocols. This makes protocols available to vendors that want to create products that adhere to standard protocols. To aid vendors in implementing standard protocols, architectural models are provided. A model provides an easy-to-understand description of the networking architecture and serves as the framework for the standards. The Open System Interface (OSI) model is an example of such a model.

The OSI model is layered. In the OSI model, protocols are organized into a stack of layers called a protocol stack (i.e. a stack). The layers are used to encapsulate and organize the functions required to generate and manage frames. Each of the layers uses the services of the layer below to build an "enriched service," i.e., a more capable service. The layered approach provides a logical division of responsibility. Each layer handles prescribed functions. Such layering can be compared to an automobile assembly line. At points along the assembly line, a handle is fitted to a door, a door is fitted to a chassis, and so on. This assembly line approach applied to protocol layers allows each protocol layer to specialize in the function provided by the layer. Such function specialization makes it easier to implement protocols and if a communication problem occurs, the problem can be isolated to a specific layer.

Using a stack of protocol layers to send a payload in a frame is analogous to sending a letter in an envelope to a friend in another city. As illustrated in FIG. 1A, the layers of transport are analogous to the protocol layers. The desired communication is between you 100 and your friend 115. Because you 100 and your friend 115 are separated by distance, you 100 cannot hand the letter directly to your friend 115. Instead, you 100 place the letter in an envelope and give the envelope to your post office 105. Your post office 105 gives the envelope to an airline 110. The airline 110 places the envelope in a shipping container and transports the shipping container to your friend's post office 120. Your friend's post office 120 removes the envelope from the shipping container and delivers the envelope to your friend 115. Your friend 115 opens the envelope and reads your letter. You do not need to find your friend's house in the distant city. That is the responsibility of the post office in that city. You only need to specify your friend's address. The post office is not concerned with how to fly an airplane. That is the responsibility of the airline. Each layer assumes that the layer below it will provide certain functions. Each layer provides additional functionality. Similarly, at each layer of a protocol stack information is added to a frame passed from layer to layer that relates to the function of the layer.

FIG. 1B shows the stacks of two exemplary computing devices Computer A 200 and Computer B 240. It can be seen that the stacks of both computing devices have the same layers: application 205 and 245; presentation 210 and 250; session 215 and 255; transport 220 and 260; network 225 and 265; and data link 230 and 270. The two stacks are connected by a physical (network hardware) layer 235. A frame that is to be sent from Computer A 200 to Computer B 240 is assembled by placing information into a frame without protocol headers, i.e., a payload, passing the frame down the stack on Computer A 200, adding headers to the frame at each layer, and sending the frame on the physical hardware layer 235. More specifically, as the frame is passed down the Computer A stack, information concerning the protocol of each layer is added to the frame. Included in the information added at each layer is information indicating which protocol is used in the layer immediately above the layer. The protocol information is used later as the frame is passed up the protocol stack of Computer B 240 and disassembled. Each layer of the stack on Computer B 240 reverses the process of the associated layer of the stack of Computer A thereby extracting the frame from physical hardware layer 235, i.e., the network, and extracting the payload from the frame.

The stacks of the two exemplary computing devices 200 and 240 in FIG. 1A are examples of OSI protocol stacks. Using the stack in Computer A 200 as an example of an OSI protocol stack, the application layer 205 provides network services such as X.400 email, HyperText Transport Protocol (HTTP), File Transfer Protocol (FTP), and telnet. The presentation layer 210 converts the information in the frame into data formatted using the format recognized by Computer A 200. The session layer 215 establishes a session, i.e., a series of information exchanges, between Computer A 200 and Computer B 240. The transport layer 220 multiplexes data streams from different applications. Those skilled in the art will appreciate that multiplexing is a technique to transmit a number of separate signals simultaneously over a single channel or line. The transport layer 220 may also provide error correction. An example of a transport protocol usable in the transport layer 220 is the Transmission Control Protocol (TCP). The network layer 225 finds a route for frames to take through the network and directs frames to the correct computer. An example of a network protocol usable in the network layer 225 is the Internet Protocol (IP). The data link layer 230 is the logical, as opposed to physical, data link. The data link layer 230 provides media access control, detects and corrects errors on the physical link, and provides control of the flow of data. For local area networks (LANs) where all computers share a communications media, this layer determines which node is allowed to transmit. Examples of data link layer protocols are Ethernet and Token Ring. The physical layer 235 defines the characteristics of the physical connections, such as type of wire, plug shape, how a zero bit and one bit are represented, what voltages are used, and so on. The physical is the only layer that actually sends bits to another computer. Examples of physical layer protocols usable in the physical layer 235 are SONET and RS-232C.

The network model used by the World Wide Web, i.e., the Internet model, probably the most commonly used network model, does not exactly follow the OSI model, but closely imitates the OSI model. Because the Internet model was designed to run on top of existing different networks, the Internet model does not define the lower layers of the OSI model. The Internet model layers are: Application, Transport, Internet, and Network Interface. The Application layer provides network services such as HTTP, FTP, and Telnet. The Transport layer multiplexes data streams from different applications and may also provide error correction. Examples of Transport layer protocols are TCP and User Datagram Protocol (UDP). The Internet layer provides routing services like Internet Protocol (IP). The Network Interface layer provides access to the Data Link and lower protocols like Ethernet.

In both OSI stacks and Internet stacks, each layer communicates with its peer layer by prefixing the data from the above layer with a header as shown in FIG. 1C. FIG. 1C shows the header prefixes for the OSI stack model. AH represents the application layer 205 header. PH represents the presentation layer 210 header. SH represents the session layer 215 header. TH represents the transport layer 220 header. NH represents the network layer 225 header. DH represents the data link layer 230 header. The physical layer is represented by the lower layer of FIG. 1C with a PH outside the header boxes and a DT at the end of the data. More specifically, the data link layer often adds a trailer to the frame that contains a cyclic redundancy check (CRC) to detect errors. This addition is represented by DT in FIG. 1C. The physical layer may, or may not, append a header or trailer to the frame.

The bottom frame, i.e., complete frame, is sent across the physical network 235. When the frame is received at the other end, the headers are stripped off as the frame is passed up the stack to the user application. Each layer provides functions or services for the layer above it. Each layer calls upon services provided by the layer below it. The layers are implemented in each computer on the network. Each layer communicates with the layer's peer layer in another computer. Although the logical communication is between peer layers on different computers, the actual flow of information is down the protocol stack on the sending computer and up the protocol stack on the receiving computer. When a layer wants to send something to the layer's peer layer in another computer, the layer calls a function in the layer below it to actually send the data. Only the lowest layer actually sends bits to another computer.

An example is an email application on Computer A 200 sending an email message frame from an email message to Computer B 240. The email application on Computer A 200 operates in the topmost layer of the stack, i.e., application layer 205. The email application adds a header, e.g., an application header (AH), to the frame. The frame is passed to the next lower layer, i.e., the presentation layer 210, where the email application or possibly another software program or service adds another header, e.g., presentation header (PH), to the frame. This process continues through all the layers until the frame reaches the lowest layer, the physical hardware layer 235, where the frame is sent to the stack of Computer B 240. The data link layer 270 of the stack of Computer B 240 extracts the frame from the physical hardware layer 235. The frame passed up the stack of Computer B 240. At each layer the header relating to the layer is read, used to make decisions about what to do with the message, and removed. At the application layer 245 of the stack on Computer B 240, an email application receives the payload and uses the payload when reconstructing the original message.

If a network data stream, i.e., stream, is interrupted or if the information in the stream is corrupted, the stream must be analyzed to find the cause of the problem. The critical and often difficult parts of the task of analyzing a stream are breaking the stream into frames and organizing the information in the frames using protocol rules so humans can understand the information. A computer program used to capture frames is called a "network monitor" and is sometimes called a "network sniffer" by those skilled in the art. A computer software program used to interpret frames according to the rules of a protocol is called a "protocol parser" (i.e. parser). A computer program that uses one or more parsers to analyze a stream is called a "protocol analyzer."

Network monitors capture, i.e., identify and extract, frames from a stream on a network and present the frames in a human-readable format. As will be readily appreciated by those skilled in the art and others the capture function is difficult to execute since a typical stream passes thousands of frames per second that a human network monitor user must analyze. To be useful, the captured frames must be narrowed down to only the frames related to a specific information exchange. A set of frames that comprise a specific information exchange is called a "conversation." Functionally, a conversation is a set of frames that are related because each of the frames in the set of frames contains identifiers that are unique to the conversation. The identifiers are built from the headers added to the frame at each protocol layer as shown in FIG. 1C and described above. A conversation takes place in one protocol layer of the protocol stacks of the communicating computers. It is possible to assemble more than one conversation from the same set of frames because conversations may be assembled for each layer in a protocol stack. If the information that uniquely identifies the frames in a conversation can be identified, a filter can be constructed to capture only the frames in the conversation.

In the prior art, the network monitor user has been required to identify the information that uniquely identify the frames in a conversation. In the past, this has usually been done by capturing a small set of frames on a restricted network during a known information exchange and searching for common values in the frames. Because this approach is time consuming and thus, inherently expensive, any assistance a network monitor can provide to help identify conversations makes the network monitor a more useful tool.

A computer program, such as a network monitor, is usually developed by writing the computer instructions in a human-readable computer language and then compiling, i.e., translating, the computer instructions into a format computing devices are able to read. Such a format is referred to as a machine-readable format and a program that has been compiled into a machine-readable format is called machine code. A computer program compiled into machine code can be executed by a computing device. While parsers may be written as integral components of a network monitor prior to the network monitor being compiled into machine code, if the parser needs to be changed, the entire network monitor must be recompiled. To avoid excessive recompiling, a parser is usually written and compiled into an independent, reusable software module. An example of such a reusable software module is a dynamically linked library (DLL). A DLL is an independent, reusable software module with a well defined interface that allows a software program to attach and use, i.e., link, the DLL while the software program is executing. A network monitor links and uses parsers compiled into DLLs. A DLL can be recompiled without affecting the network monitor that links to the DLL.

In the prior art, parsers, i.e., parser DLLs, have been developed for each of the two hundred or so industry standard protocols. A network monitor has been developed to link to each parser. In addition to industry standard protocols, new protocols to address special needs are constantly being introduced requiring new parsers to be developed and linked into network monitors. Developing and maintaining parsers and writing the computer instructions in the network monitor to link to parsers is difficult, time consuming, and therefore, costly. A single parser usually comprises one thousand or more lines of computer instructions. After a parser is compiled into a DLL, only a description of the DLL's interface is available to the computer programmer who intends to link the DLL into a network monitor. Unless the computer programmer has access to the original parser computer instructions in the parser, it is impossible for the programmer to know the nature or quality of the DLL. Even with a copy of the original computer instructions, a computer programmer may need to study a parser for hours or even days to assess the robustness and security of a parser. The hidden nature of compiled DLLs causes other problems. Many parsers perform similar functions but, since the parsers, i.e., DLLs, are often developed by different computer programmers at different times, the computer instructions to implement the same or similar functions may have been rewritten dozens of times making the instructions difficult to interpret and often in error. Also, if a defect is discovered and corrected in one parser, the correction is often not propagated to other parsers performing similar functions.

The problems described above demonstrate a clear need for a way to more easily develop and maintain parsers for a large and growing plurality of protocols; more easily integrate parsers into a network monitor; reduce the number of computer instructions in each parser; make parsers more transparent to those who use parsers; centralize the common aspects of parsers; and assist in identifying conversations.

SUMMARY OF THE INVENTION

In accordance with the present invention, a method, apparatus, and computer-readable medium for analyzing network data streams with parsers generated using script based parser protocol descriptions is provided. The script based parsers are used to analyze the captured frames of a network data stream and identify conversations in the frames.

In accordance with one aspect of the invention, the script based parsers are written in a language that describes network protocols.

In accordance with another aspect of the invention, a script interpreter interprets script to build one or more parsers in the memory of a computing device.

In accordance with a further aspect of the invention, a parsing engine uses the protocol parsers stored in memory to parse frames.

In accordance with yet another aspect of the invention, a capture engine captures frames for parsing and parsed frames are organized into conversations.

In accordance with a further aspect of the invention, the parsing of frames is optimized by substituting data structure sizes for data structures that are not of interest in a particular parser.

As will be readily appreciated from the foregoing description, the present invention provides methods, apparatus, and computer-readable medium for improving the analysis of network data streams using script based parsers. The script based parsers improve the analysis of captured network data stream frames by parsing the frames in order to determine which frames contain conversations that pertain to a specific analysis. In one form, the invention provides a method of identifying pertinent conversations in a network data stream. The method includes capturing the frames of the network data stream, parsing the captured frames using a protocol parser created by interpreting script written in a language describing network protocols, and organizing the parsed frames into conversations. In another form, the invention provides a method of creating protocol parsers for use in analyzing network data streams that includes interpreting script written in a language describing network protocols, using the script interpretations to create protocol parsers and storing the parsers in memory.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1C is a diagram showing how headers and trailers are added to a frame in each layer of a protocol stack;

FIG. 9 is an example of a portion of an exemplary parser script; and

DETAILED DESCRIPTION OF THE PREFERRED EMBODIMENT

Embodiments of the invention provide a network monitor for analyzing a stream of data on a network using parsers generated from script based parser descriptions. The network monitor and the script based parser descriptions used by the network monitor enable the network monitor to capture network data stream frames and identify the conversations included in a plurality of frames. An exemplary network monitor suitable for employing an embodiment of the invention is Microsoft Network Monitor, i.e., NetMon. Embodiments of the invention can be used in NetMon to read a data stream between two computers, extract certain frames from the data stream and assemble one or more conversations from the frames.

Figure 2:
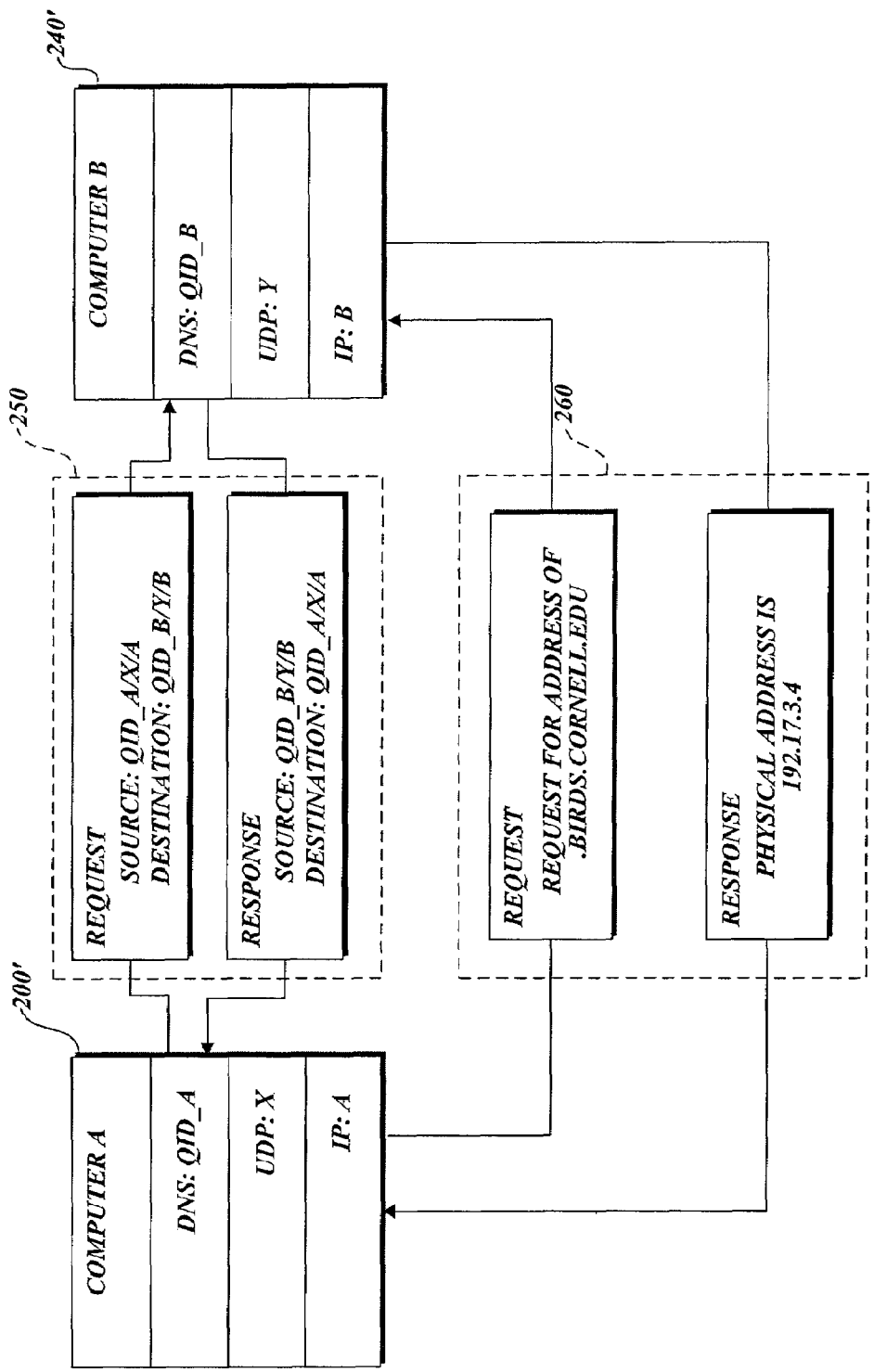
FIG. 2 is a block diagram showing the information exchanged in exemplary conversations between two exemplary computing devices.

Two exemplary conversations between Computer A 200' and Computer B 240' are shown in FIG. 2. In order to make the communication process shown in FIG. 2 easier to understand, the data items shown in FIG. 2, e.g., QID_A, are symbols representing more complex actual data items. One exemplary conversation is depicted as assembled in a Domain Name System (DNS) layer 250 and the other exemplary conversation is depicted as assembled in an IP layer 260. It is also possible to assemble a conversation in the UDP layer. Both of the conversations, 250 and 260, result from a DNS query. DNS provides a hierarchical system by which a host on the Internet, i.e., a computer connected to the Internet, can map an IP address, e.g., 192.17.3.4 to a more easily readable and memorable domain name, e.g., birds.cornell.edu. A network connected to the Internet has at least one DNS server that provides a domain name to IP address mapping service. A DNS query comprises a request from a computer on a network to a DNS server and a response from the DNS server to the computer. Computer A 200' sends a DNS request to Computer B 240'. Computer B 240', i.e., a DNS server, sends a DNS response to Computer A 200'.

Figure 1A:
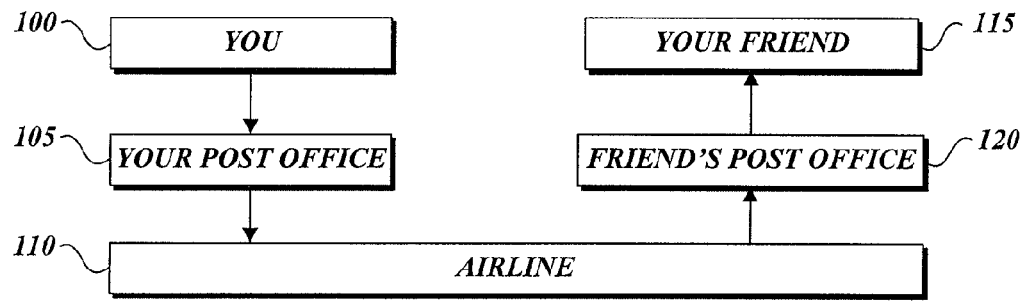
FIG. 1A is a diagram showing, by analogy, how protocol stacks operate.
Figure 1B:
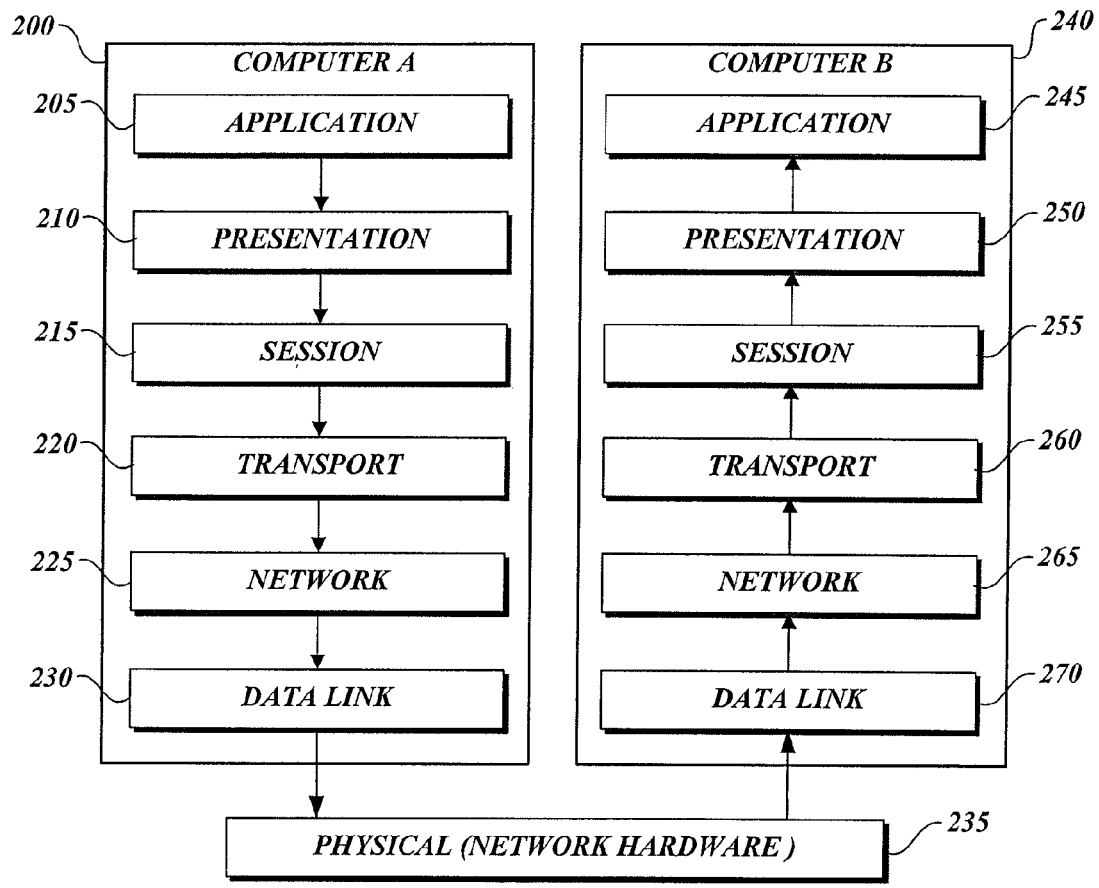
FIG. 1B is a diagram showing exemplary protocol stacks on two exemplary computing devices.

The request and response frames are made ready for transport by attaching headers to the frames as shown in FIG. 1C. Returning to the analogy of sending a letter illustrated in FIG. 1A, just as the letter is placed into successive shipping containers, e.g., envelopes and boxes, as the letter is passed from the sender to the post office and to the airline, a payload is placed into successive protocol "containers," i.e. headers forming a frame. As shown in FIG. 2, the DNS protocol layer attaches a header containing a Queue Identifier (QID) to frames passed to the DNS layer, e.g., QID_A, QID_B. As described more fully below, QID_A identifies the QID for Computer A 200' and QID_B identifies the QID for Computer B 240'. A QID is used identify the message queue and data structure associated with each message being sent or received. The UDP protocol layer attaches headers X and Y. The IP protocol layer attaches headers A and B.

In the exemplary DNS conversation 250, the request contains a source ID, i.e., source, and a destination ID, i.e., destination. The source ID uniquely identifies the source of the request, i.e. Computer A 200'. The source ID is built up from headers added at each layer of the protocol stack. For example, the DNS layer adds "QID_A;" the UDP layer adds "X;" and the IP layer adds "A." The exemplary source ID resulting from these additions is "QID_A/X/A." Similarly, the destination ID "QID_B/Y/B" is assembled from the protocol stack of Computer B 140. The response, generated by Computer B 140, also contains a source ID and destination ID. In the response, the source ID is "QID_B/Y/B" and the destination ID is "QID_A/X/A."

In the exemplary Ethernet conversation 260, the request and response also contain a source ID and destination ID as did the request and response in the DNS conversation 250. Once again, the source and destination IDs are built up from headers added at each layer of the protocol stack; however, there is only one protocol layer involved, the IP protocol layer. The IP protocol layer adds the "A" header to the source ID of the request and adds the "B" header to the destination ID of the request. In the response, the IP protocol layer adds the "B" header to the source ID of the request and adds the "A" header to the destination ID of the request.

Figure 3:
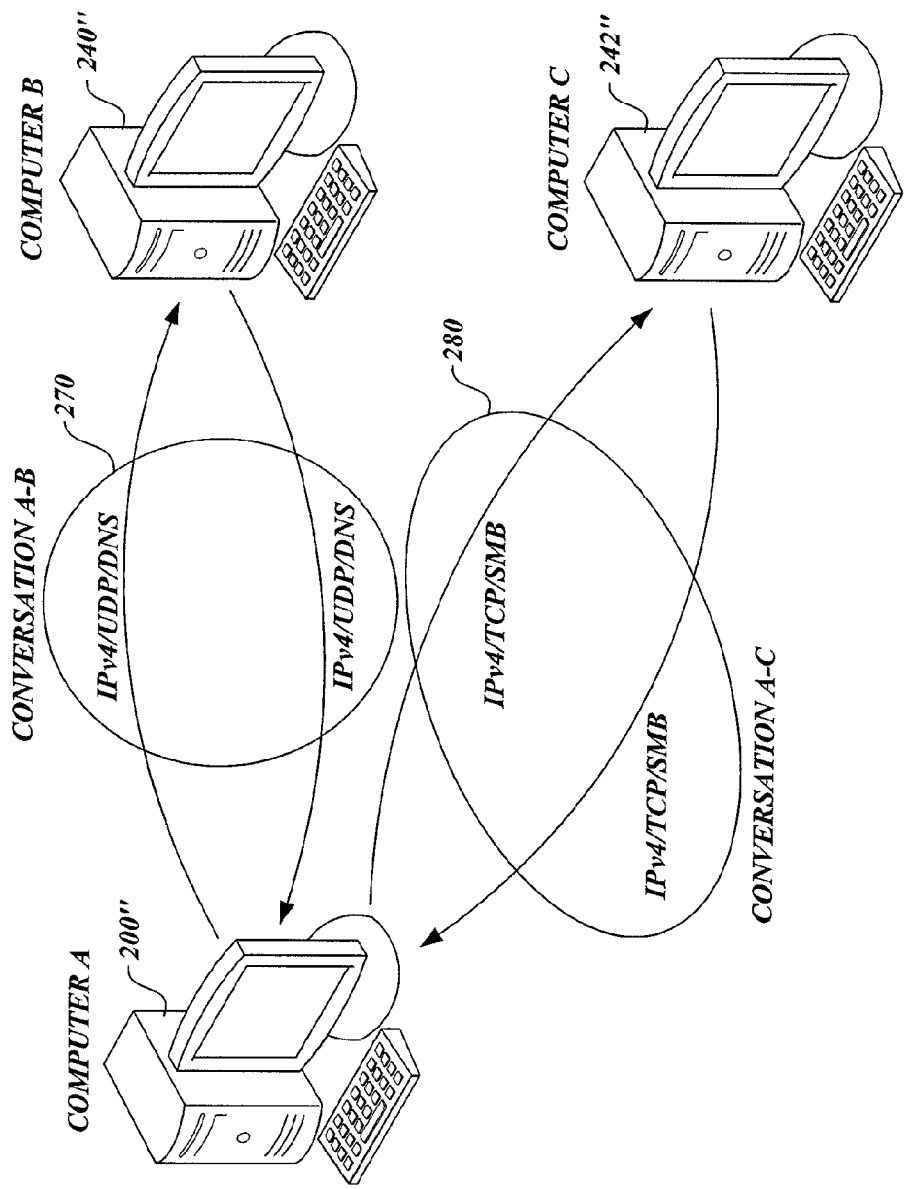
FIG. 3 is a pictorial diagram showing two exemplary conversations among three computing devices.

A network monitor formed in accordance with the invention extracts frames from the data stream. Each frame header is examined to determine the conversation to which the frame belongs. For example, given three computers that are able to communicate among themselves, a plurality of conversations is possible. A network monitor employing the invention can be used to select and examine frames from the conversations. FIG. 3 shows two exemplary conversations among three computing devices. Conversation A-B 270 is between Computer A 200" and Computer B 240". Conversation A-C 280 is between Computer A 200" and Computer C 242". Frames in Conversation A-B 270 can be distinguished from frames in Conversation A-C 280 by the source and destination IDs in each frame of the conversations. In the example shown in FIG. 3, the source and destination IDs of Conversation A-B 270 contain "IPv4/UDP/DNS" whereas, the source and destination IDs of Conversation A-C 280 contain "IPv4/TCP/SMB."

Figure 4:
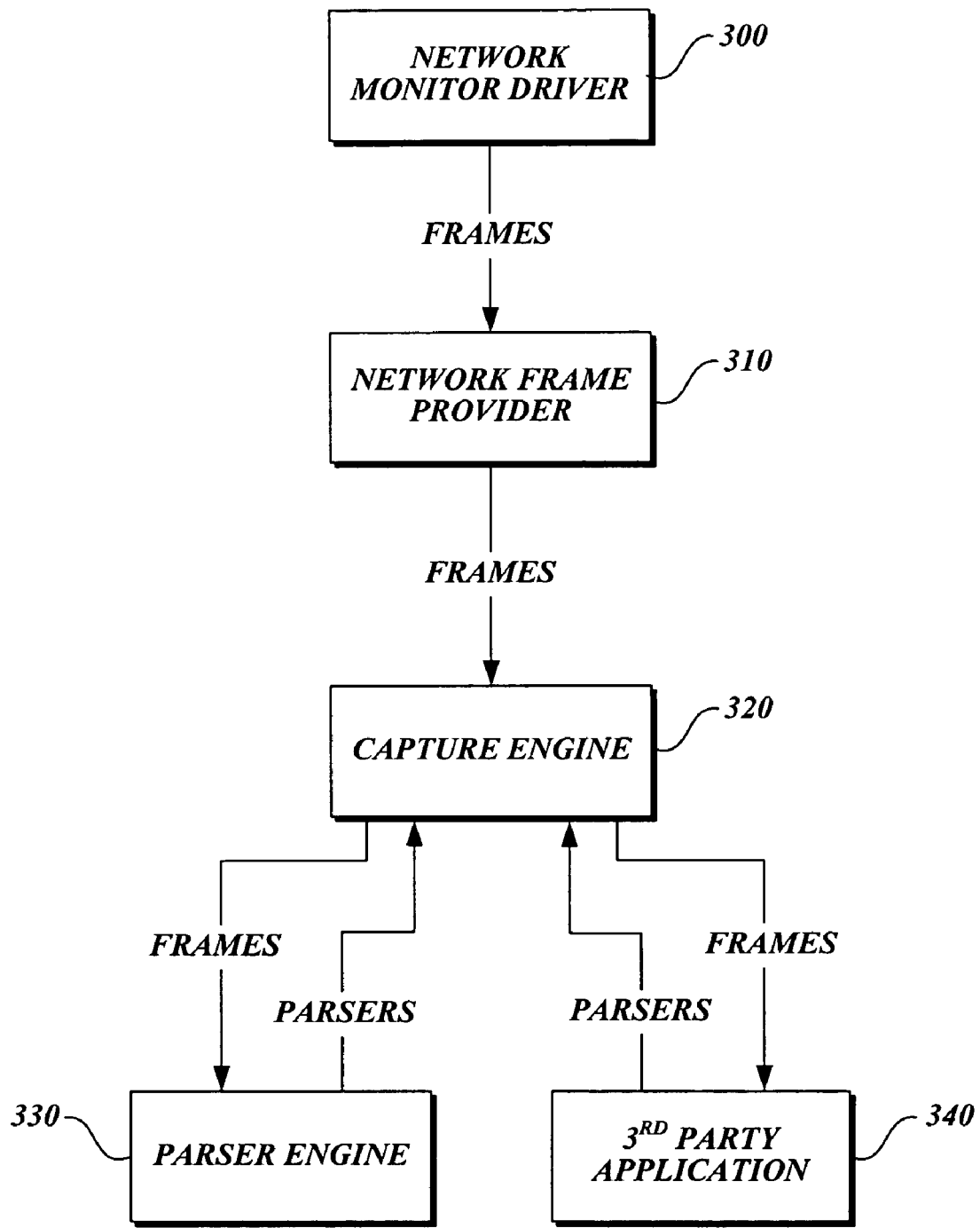
FIG. 4 is a block diagram of the software components of an exemplary network monitor.

The frame extraction and examination described above is performed by the network monitor. For example, the aforementioned network monitor driver functions can be performed by the software components shown in FIG. 4. The software components include a network monitor driver 300, which collects frames from a network. The network monitor driver 300 passes the frames to a network frame provider 310. The network frame provider 310 passes the frames to a capture engine 320. The capture engine 320 passes the frames to either a parser engine 330 included in the network monitor or a third party application 340.

Figure 5:
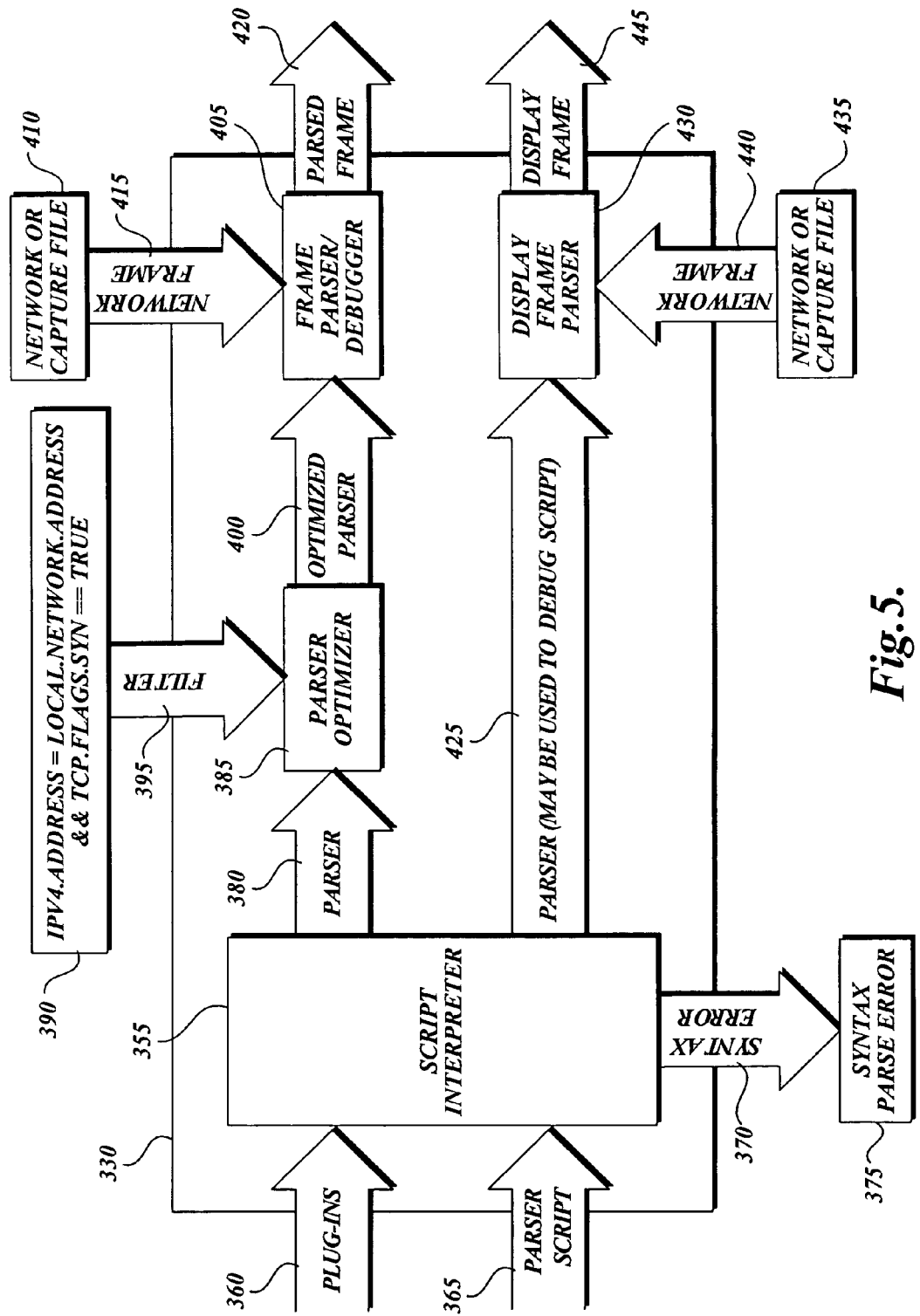
FIG. 5 is a block diagram showing how data flows through an exemplary network monitor.

A block diagram of an exemplary parser engine 330 is shown in FIG. 5. From a high level architectural viewpoint, the parser engine 330 receives plug-ins 360 and a parser script 365 and generates a parsed frame 420 or a display frame 445, i.e., a frame that is able to be displayed in human readable form. The parser script 365 describes a plurality of protocol parsers in a scripting language. A portion of an exemplary parser script written in an exemplary scripting language is shown in FIG. 9. Plug-ins 360 are external software modules, i.e., DLLs, that are callable within the parser script and that provide elements in the parser script 365 that are not describable by the scripting language.

From a more detailed architectural viewpoint, when the parser engine 330 is started, a script interpreter 355 reads a parser script 365. The script interpreter 355 interprets the descriptions of protocol parsers in the parser script 365 and builds a schema containing the protocol parsers in the memory of the computing device running the network monitor. Those skilled in the art will appreciate that a "schema" comprises one or more data structures. The schema in memory contains a plurality of protocol parser data structures, one protocol parser data structure for each protocol parser described in the parser script. If the script interpreter 355 encounters a syntax error 370 in the parser script 365, the script interpreter 355 outputs a syntax parse error 375.

Storing the protocol parser data structures in memory allows the parser engine 330 to dynamically optimize protocol parsers as needed. Optimized parsers allow frame data that is not of interest to be ignored thereby reducing the time it takes to apply a protocol parser. More specifically, a protocol parser 380 stored in memory is passed to a parser optimizer 385. The parser optimizer 385 also receives a filter 395 such as "IPV4.Address==Local. Network.Address && TCP.flags.syn==TRUE," for example, as shown in block 390. The parser optimizer applies the filter 395 to the protocol parser 380 and generates an optimized parser 400. Details of protocol optimization and filters are discussed below. In this regard, while desirable, a protocol parser does not need to be optimized and can be used without optimization. The optimized protocol parser 400, or an unoptimized protocol parser 380, is passed to a frame parser/debugger 405. The frame/parser debugger 405 also receives a network frame 415 from the network or from a capture file 410. A capture file is a file containing frames from a network. The frame/parser debugger 405 applies the optimized protocol parser 400, or unoptimized protocol parser 380, to the network frame and outputs a parsed frame 420. More specifically, the frame/parser debugger 405 applies the schema to decide if a frame should be kept or dropped. If the frame/parser debugger 405 decides to keep the frame 420, the filter 395 is applied to the frame 420. If the frame 420 passes the filter 395, the frame/parser debugger 405 outputs the frame 420.

Preferably, the parser engine 330 also provides a parser script debugging feature that allows an operator to see how a script is applied to a frame. The protocol parser, with the debugging feature, 425 is passed to a display frame parser 430. The display frame parser also receives a network frame 440 from the network or a capture file 435 and outputs a display frame 445, i.e., a description of a frame that is displayable in a user interface.

A schema in the form of a plurality of protocol parser data structures is stored in memory. The stored protocol parser data structures include fields that contain data relevant to a protocol. More specifically, the memory protocol parser data structure is organized using datatypes and datafields. A datatype defines the size of a section of memory, provides a named type for the section of memory, and describes the layout of data in the section of memory. If the section of memory is a fixed size, the datatype defines the fixed size, e.g., 4 bytes. If the section of memory varies in size as required by the application of the datatype, the datatype defines the size as −1. A datafield contains one or more data items mapped to the memory layout a datatype describes. A datafield's size is the size of the datafield's datatype. If the datafield varies in size as required by how the datafield is used, the datatype has a size of −1. A data item in a datafield can be a value or a pointer. A pointer in a datafield may point to a value, a datafield, or a datatype.

Figure 6A:
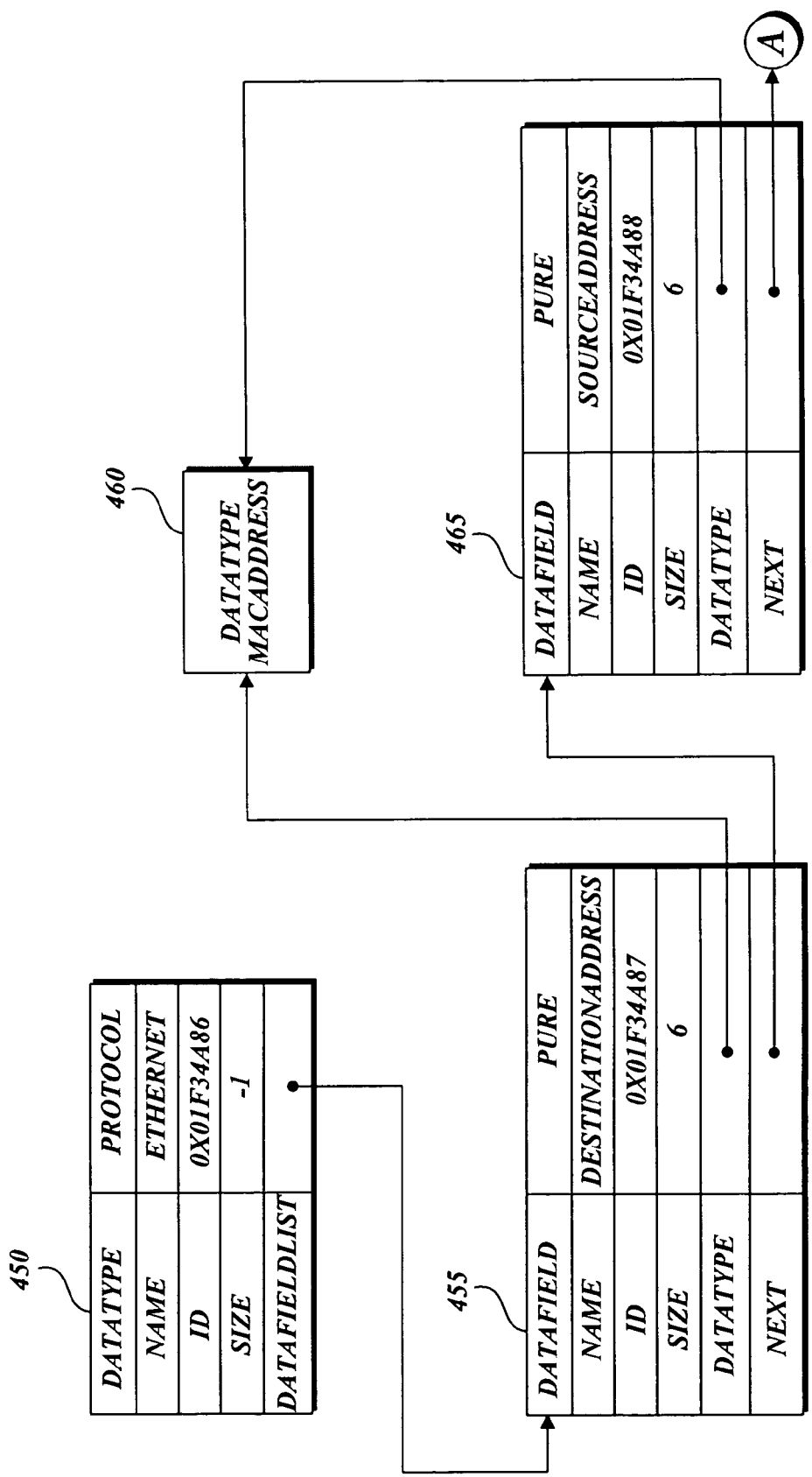
FIGS. 6A-6C comprise a diagram of the schema of an exemplary protocol parser data structure.
Figure 6B:
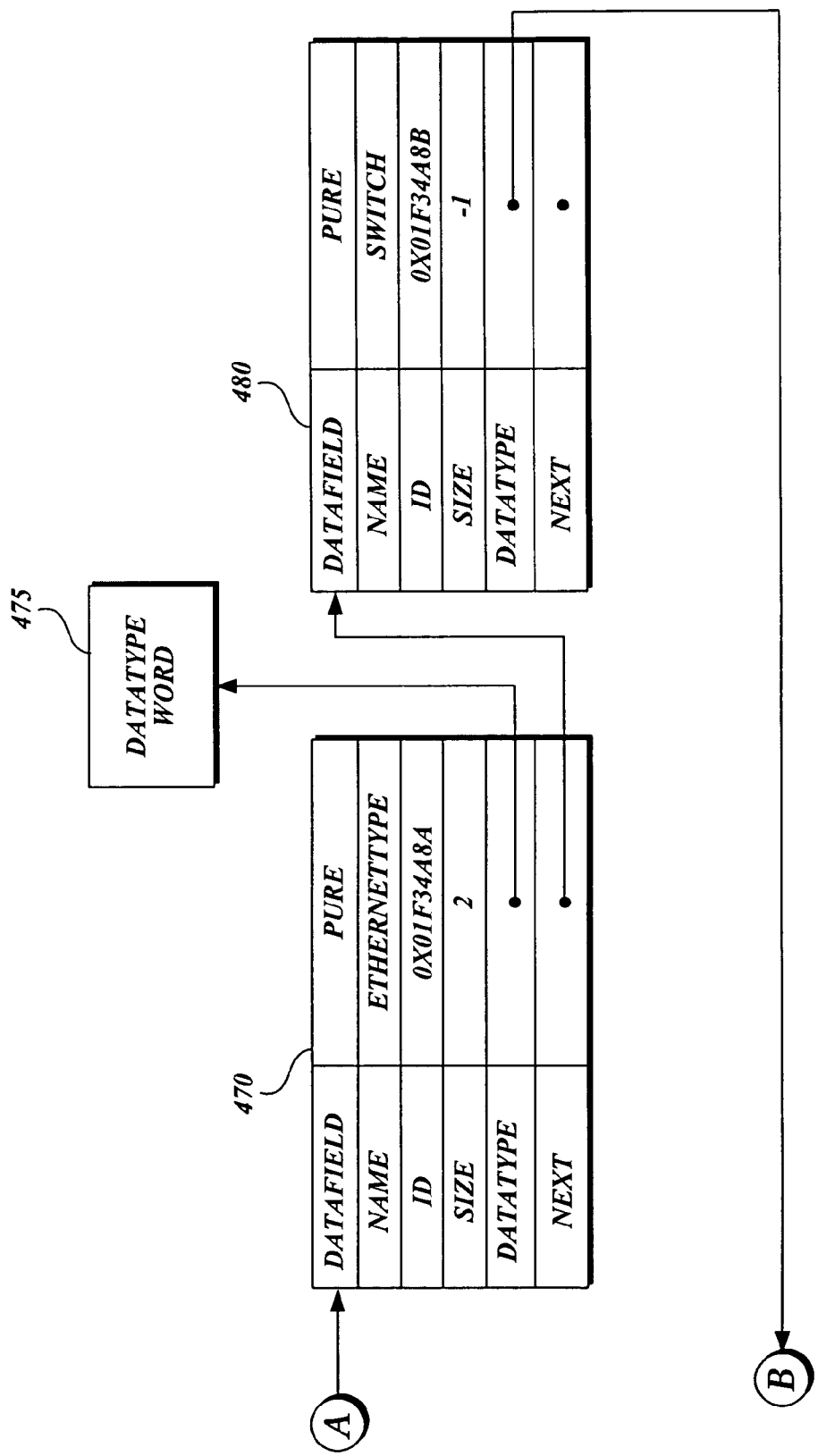
Figure 6C:
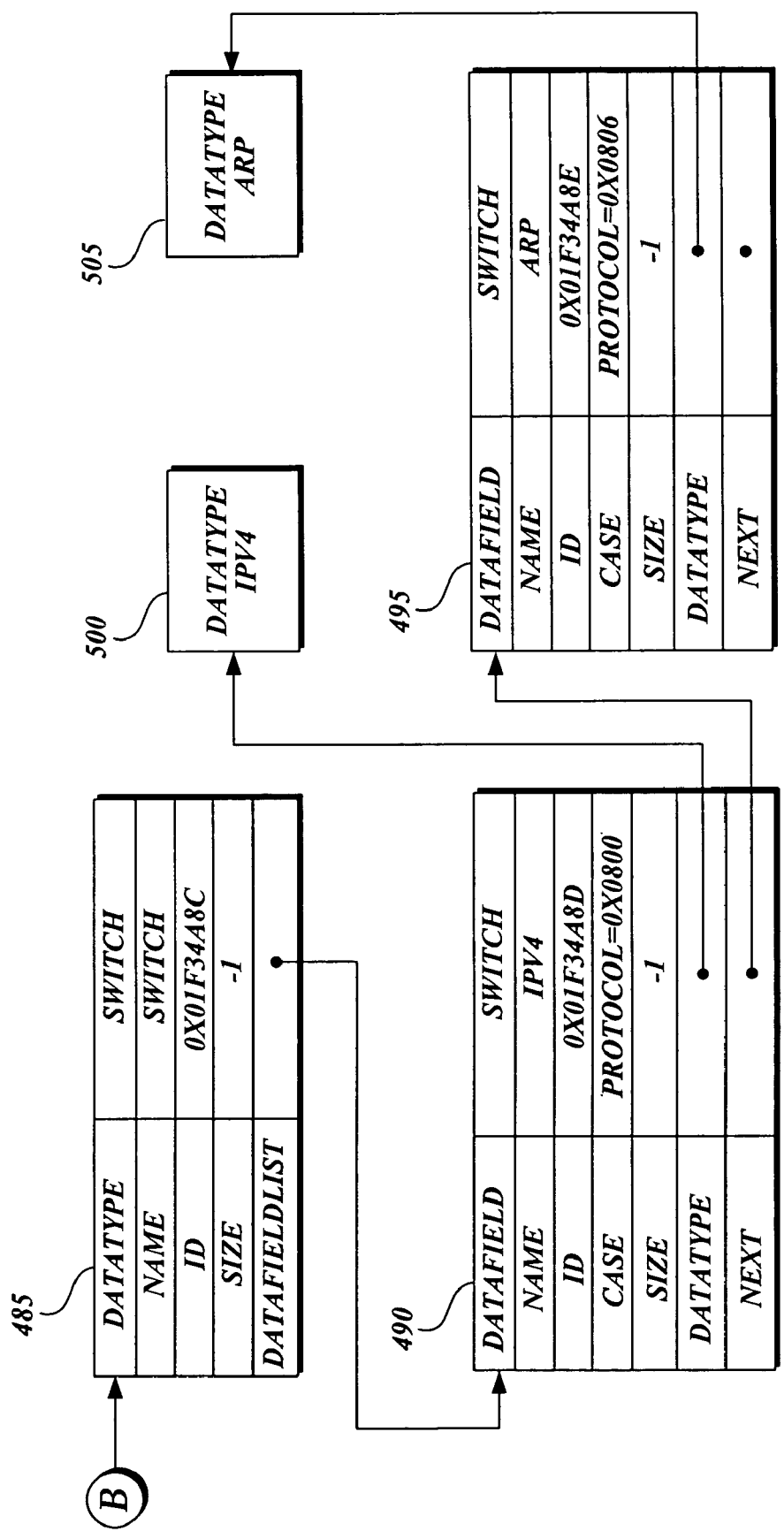

FIGS. 6A, 6B, and 6C comprise a diagram representing the schema of an exemplary protocol parser stored in the memory of a computing device. The illustrated schema includes a plurality of data structures. In FIG. 6A, a Protocol Datatype, i.e., the datatype of a protocol, 450 contains data items, i.e., field values, for a protocol parser. The exemplary Protocol Datatype 450 contains a Name field, an identifier, i.e., an ID, a Size field, and a DatafieldList field. The datatype Name field is a human-readable string that describes the type of data item the datatype contains. In this example, the Name field in the Protocol Datatype 450 is "Ethernet" indicating that Protocol Datatype 450 contains data for an Ethernet protocol parser. The Protocol Datatype identifier, i.e., the ID, is a unique number by which the parser engine 330 can identify the datatype. The Protocol Datatype ID must uniquely identify a Protocol Datatype therefore it is essential that no two Protocol Datatype IDs be the same. The ID in the Protocol Datatype 450, illustrated in FIG. 6A, is "0X01F34A86." The Size field of Protocol Datatype 450 is "−1," indicating that the size of the memory a Protocol Datatype occupies varies according to usage, as described above. The exemplary Protocol Datatype 450 illustrated in FIG. 6A also contains a DatafieldList field that points to a list of datafields. The first datafield in the list of datafields is a Pure Datafield 455. A Pure datafield is a datafield that is not part of a Switch datafield. A Switch datafield stores one value with a value type selected from a plurality of value types. A Pure datafield is a datafield that is not one of the plurality of value types of a Switch datafield. In addition to the field, i.e. Pure, that identifies the datafields shown in FIGS. 6A and 6B, the datafields also contain Name, Identifier, i.e., ID, Size, Datatype, and Next fields. The Name of the Pure Datafield 455 is "DestinationAddress" and the ID, i.e., "0X01F34A87," is a unique number by which the parser engine 330 can identify the datafield. The Size of the Pure Datafield 455 is 6 bytes, which is the size of a MacAddress datatype. The Datatype of the Pure Datafield 455 is Datatype MacAddress 460. The Next field of the Pure Datafield 455 points to the next datafield in the datafield list, namely, a second Pure Datafield 465. The name of the second Pure Datafield 465 is "SourceAddress." and the ID of the second Pure Datafield 465 is "0X01F34A88." The Size of the second Pure Datafield 465 is 6 bytes and the Datatype is MacAddress 460. The Next field of the second Pure Datafield 465 points to the next datafield in the datafield list, namely a third Pure Datafield 470 illustrated in FIG. 6B.

The Name of the third Pure Datafield 470 (FIG. 6B) is "EthernetType" and the ID is "0X01F34A8A." The Size of the third Pure Datafield 470 is 2 bytes and the Datatype is Datatype Word 475. Datatype Word 475 is a primitive datatype, i.e., Datatype Word 475 is not derived from other datatypes. The Next field of the third Pure Datafield 470 points to the next datafield in the datafield list, namely a fourth Pure Datafield 480. The Name of the fourth Pure Datafield 480 is "Switch" and the ID is "0X01F34A8B." The Size of the fourth Pure Datafield 480 is −1, which means that the size of the fourth Pure Datafield 480 is variable. The size of the fourth Pure Datafield 480 is variable because a Switch datafield stores one value with a value type selected from a plurality of value types. For example, a Switch datafield can store a Word value comprising 4 bytes or a DoubleWord value comprising 8 bytes. The Datatype of the fourth Pure Datafield 480 is a Datatype Switch 485 shown in FIG. 6C and described below. The Next field of Pure Datafield 480 is null, i.e., points to no other datafield meaning that the fourth Pure Datafield 480 is the last datafield in the datafield list pointed to by the DatafieldList value of the Protocol Datatype 450.

The Name of the Datatype Switch 485 shown in FIG. 6C is "Switch" and the ID is "0X01F34A8C." The Size of the Datatype Switch 485 is −1. The size of the Datatype Switch 485 is variable because Datatype Switch 485 is a Switch. The Datatype Switch 485 is also a primitive datatype. The Datatype Switch 485 has a DatafieldList field that points to the first item in the datafield list, namely a first Datafield Switch 490. In addition to the field, i.e., Switch, that identifies the datafields shown in FIG. 6C, the datafields also include Name, Identifier, i.e., ID, Case, Size, Datatype, and Next fields. The Name field of the first Datafield Switch 490 is "IPV4" and the ID is "0X01F34A8D." Those skilled in the art will appreciate that IPV4 is a version of Internet Protocol (IP). The Case field of the first Datafield Switch 490 has a value of "Protocol=0X0800." The case field is used to differentiate frames by protocol type. The Size field of the first Datafield Switch 490 is −1. The Datatype field of the first Datafield Switch 490 is Datatype IPV4 500. The Next field of the first Datafield Switch 490 points to the next datafield in the datafield list, i.e., a second Datafield Switch 495. The Name of the second Datafield Switch 495 is "ARP" and the ID is "0X01F34A8E." Those skilled in the art will appreciate that ARP refers to Address Resolution Protocol. The Case field of the second Datafield Switch 495 has a value of "Protocol=0X0806." The Size field of the second Datafield Switch 495 is −1. The Datatype field of the second Datafield Switch 495 is ARP 505. The Next field of the second Datafield Switch 495 is null, meaning that the second Datafield Switch 495 is the last datafield in the datafield list pointed to by the DatafieldList value of the Datatype Switch 485.

A network monitor formed in accordance with the invention uses a plurality of protocol parsers, such as the exemplary protocol parser described above and represented by the diagram in FIGS. 6A, 6B, and 6C, to select frames captured from a network data stream by a capture engine. The capture engine 320 receives frames from the network frame provider 310. The capture engine 320 provides captured frames to the parser engine 330 and the parser engine 330 uses protocol parsers to select frames. Note that, except for rudimentary filtering at the driver level, when a frame is available on the network, the frame is captured regardless of the frame's type or content. The capture engine 320 delivers each captured frame to the parser engine 330. The parser engine 330 applies a schema to a frame delivered by the capture engine 320.

A simple example of the capture process is capturing frames using an overall schema. An overall schema is a schema that contains all of the protocol data structures represented in a parser script 365. The capture process using an overall schema comprises the following steps: a) a frame is received by the capture engine 320; b) the capture engine 320 passes the frame to the parser engine 330; c) the parser engine 330 uses the overall schema causing the parser engine 330 to parse the frame using the protocols described in the overall schema; d) the parser engine 330 outputs the parsed data, e.g., in XML format, to a display or to a file; and e) another frame is received by the capture engine 320 and the process repeats. Note that in step (c), as soon as the frame matches a protocol, the frame is parsed.

A more complex and typical example of the capture process is capturing frames using an optimized schema. An optimized schema is created from the overall schema and a specified set of filters. An optimized schema indicates were the values of interest are located in a frame, the interdependencies of the values of interest, and how to extract the values of interest. An optimized schema can be thought of as a template providing syntactic indicators, e.g., format and position, to indicate which frame values are of interest and should be collected and which should be ignored. An optimized schema enables selecting frames containing certain values of certain protocol elements of certain protocols.

The capture process using an optimized schema comprises the following steps: a) a filter for the preferred frames is constructed from the parsers available in the overall schema; b) the filter is passed to parser engine 330; c) a frame is received by the capture engine 320; d) the capture engine 320 passes the frame to the parser engine 330; e) the parser engine 330 applies an optimized schema to the frame in order to extract values of interest; f) the filter is applied to the extracted values of interest; g) if the extracted values of interest do not pass the filter, the parser engine 330 discards the frame and returns to step (c); h) the parser engine 330 outputs the parsed data, e.g., in XML format, to a display or to a file; and i) another frame is received by the capture engine 320 and the process repeats from step (c).

By applying a schema to the frame the parser engine 330 extracts values of interest from the frame and stores the extracted values of interest in a table. After values are extracted from the frame and placed in a table, the parser engine 330 applies a filter to the table. A filter is an expression e.g., filter 390 "IPV4.Address== LocalNetworkAddress && TCP.flags.syn== TRUE" that contains variables that reference table values. Note that in FIG. 5 "LocalNetworkAddress" is represented in filter 390 as "LOCAL.NETWORK.ADDRESS" using periods to more clearly separate the parts of the name. For example, in filter 390, there are three variables: "IPV4.Address," "LocalNetworkAddress," and "TCP.flags.syn." The expression shows the desired relationship of the variables, i.e., if the IPV4 address is equal to the local network address ANDed with TCP flags, then the expression evaluates to TRUE. If the filter 390 evaluates to TRUE, the parsed frame 420 is output, e.g., to a user interface or to a file. If the filter 390 evaluates to FALSE, no frame is output. If a value cannot be found for a variable, the value signifying "non-existent" is inserted into the variable's slot in the variable table. A non-existent value returns TRUE when, and only when, compared to a non-existent value. For example, if "TCP.flags.syn" in filter 390 is not found, a "non-existent" value is entered in the table in place of a value for the variable "TCP.flags.syn." "LocalNetworkAddress" is a constant in the expression. If the value for "LocalNetworkAddress" equals the value of "IPV4.Address," the filter evaluates to "TRUE." If the value for "LocalNetworkAddress" is not equal to the value of "IPV4.Address," the filter evaluates to "FALSE." The simple filter 330 illustrated in FIG. 5 and described above should be construed as exemplary and not as limiting. A plurality of filters may be "stacked," i.e., combined, to include expressions at various levels enabling the parser engine 330 to filter for more specific variable values.

Figure 7:
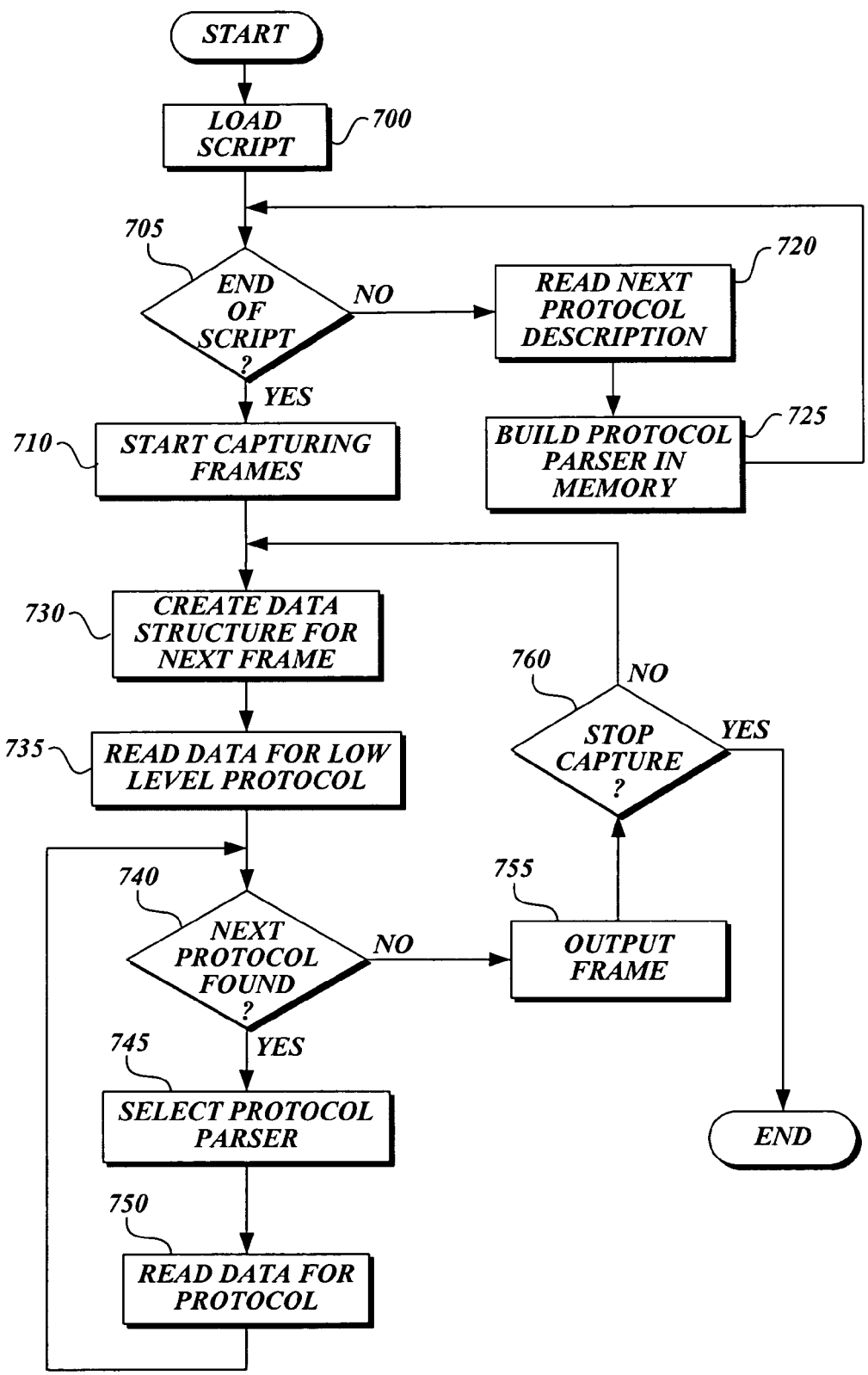
FIG. 7 is a flow diagram showing how an exemplary network monitor captures frames and outputs frame information.

The FIG. 7 flow diagram shows how the parser engine 330 uses a parser script 365 to select frames captured from a network data stream. At block 700 the parser script 365 is loaded by the parser engine 330 into the script interpreter 355. The script interpreter 355 reads protocol parser descriptions in the parser script 365. The script interpreter 355 reads a line of text from the parser script 365. At block 705, the script interpreter 355 checks to see if the end of the script has been reached. If the end of the script has not been reached, at block 720, the script interpreter 355 reads the next protocol description. At block 725, the protocol description text is used to build a protocol parser data structure in the schema, i.e., the overall schema, in the memory of the computing device. The process represented by blocks 720 and 725 is repeated until all of the protocol descriptions in the parser script 365 have been read and protocol parser data structures for each protocol description are built in memory. The overall schema is then available for use by the parser engine 330. At block 710 the parser engine 330 starts capturing frames by reading data in a network data stream. The network data stream may come from a network or from a file of data collected from a network.

At block 730, the parser engine 330 creates a new frame data structure in memory for the frame captured by the capture engine 320. The frame data structure that the parser engine 330 creates in memory conforms to the format of the protocol parser that is designated as the first, i.e., default, protocol parser of the plurality of protocol parser data structures that for the schema stored in memory. A protocol parser data structure included in the schema stored in memory can be designated as the default protocol parser in the parser script or can be designated by a human operator of the network monitor before data is read by the capture engine. Typically, a low level protocol parser, i.e., a parser for a protocol in the data link layer, is designated as the default protocol parser. For example, a typical low level protocol parser is an Ethernet protocol parser. An Ethernet protocol parser can be set as the default protocol parser.

At block 740, the parser engine 330 examines the frame to determine if the frame contains information that enables the parser engine 330 to determine the next protocol used in the frame. If the next protocol cannot be determined, at block 755, the parser engine outputs the frame. The data in the frame that has not been formatted by applying a protocol parser remain unformatted, i.e. unschematized. The next protocol may be indeterminate because there are no more protocols in the frame or because no protocol parser could be found for the next protocol. In either case, at block 760, if the capture process is stopped, the process ends. If the capture process continues, the flow of control is returned to block 730 where a next frame is analyzed and a data structure for the next frame is created.

If, at block 740, the next protocol is found, at block 745, the parser engine 330 selects the protocol parser for the protocol. The protocol parser is applied to data in the frame which formats the data. The formatted data is put into the data structure. The parser engine 330 is able to determine the next protocol by examining the information in the current protocol. For example, a protocol contains a datafield named "NEXTPROTOCOL." The "NEXTPROTOCOL" datafield contains the name of the next protocol, e.g., IP. Therefore, the parser engine 330 selects the IP protocol parser and passes the IP protocol parser to the capture engine 320. At block 750, the capture engine 320 applies the IP protocol parser. The process remains in this loop until all protocols have been processed in descending order. As will be readily understood by those skilled in the art and others from the foregoing description, protocols and protocol parsers other than those specifically referred to in the foregoing description may be used in the aforementioned process and that the specific reference to Ethernet and IP protocols and protocol parsers should be construed as exemplary and not limiting.

In the capture process described above, an exemplary parser engine and exemplary capture engine work together to read a network data stream and extract frames from the stream. However, unless the frames are organized in a meaningful way, it is difficult to make use of the information contained in the frames. One way to organize a plurality of frames is to find a pattern of similar information across the plurality of frames and filter the frames using the pattern. In order to be an effective filter, the pattern of similar information must appear in the frames of interest but in no other frames in the plurality of frames. A conversation is an example of a pattern that can be used to filter a plurality of frames to extract a subset of related frames from a plurality of frames. If information can be found that uniquely identifies the frames associated with a conversation, a filter can be constructed to capture only the frames related to the conversation. The conversation can then be assembled from the frames. Assembling a conversation from such frames is called "threading" a conversation.

For example, a plurality of conversations can be threaded within a DNS query. A DNS query comprises two frames, a request frame and a response frame. An exemplary conversation can be threaded across the two frames comprising the DNS query by focusing on one protocol layer, e.g., the IP layer. The information in the IP layer in a frame comprises a source address and a destination address. Because the two addresses are unique and a DNS query comprises only two frames and the two unique addresses are in the two frames, the two frames comprise a conversation in the IP layer.

The aforementioned example is illustrated in FIG. 2 by conversation 260. As previously described, conversation 260 takes place between Computer A 200' and Computer B 240'. In the request frame sent by Computer A 200' to Computer B 240', the source address is A and the destination address is B. In the response frame sent by Computer B 240' to Computer A 200', the source address is B and the destination address is A. Since the source address of the request frame matches the destination address of the response frame and the source address of the response frame matches the destination address of the request frame, the request and response frames comprise a conversation in the IP layer. Thus, a conversation can be threaded, i.e., assembled, from the IP layer request and response frames.

Similarly, conversation 250 shown in FIG. 2, can be threaded in the DNS protocol layer. As previously described, the source and destination addresses in the DNS protocol layer are assembled by progressively combining identifiers from the protocol layers below the DNS protocol layer. Since identifiers in the IP layer are unique addresses, identifiers in the protocol layers above the IP layer, which are combined with the IP layer, are also unique. For example, the source address in the request frame in the DNS protocol layer is "QID_A/X/A." The address "QID_A/X/A" identifies the source as using the IP address "A"; the UDP address "X"; and the "QID_A" message queue.

In the aforementioned description of conversation threading, information in a protocol layer of a frame is combined with the identifier in the protocol layer below the protocol layer to create an identifier for the protocol layer of the frame. Preferably, hashing is used to combine information in a protocol layer of a frame with the identifier in the protocol layer below the protocol layer to create an identifier for the protocol layer. Those skilled in the art will appreciate that hashing is a method of transforming a value or set of values into a unique key, i.e., a hash key. The value or set of values, which may be numeric or alphabetic or alphanumeric, are submitted to a hashing function. The hashing function combines the submitted values in a prescribed way and generates a hash key. Hashing has the advantage of using one number, a hash key, i.e., conversation key, to uniquely identify a conversation instead of having to replicate and/or examine in detail specific information in a protocol layer and the protocol layers below the protocol layer.

Figure 8:
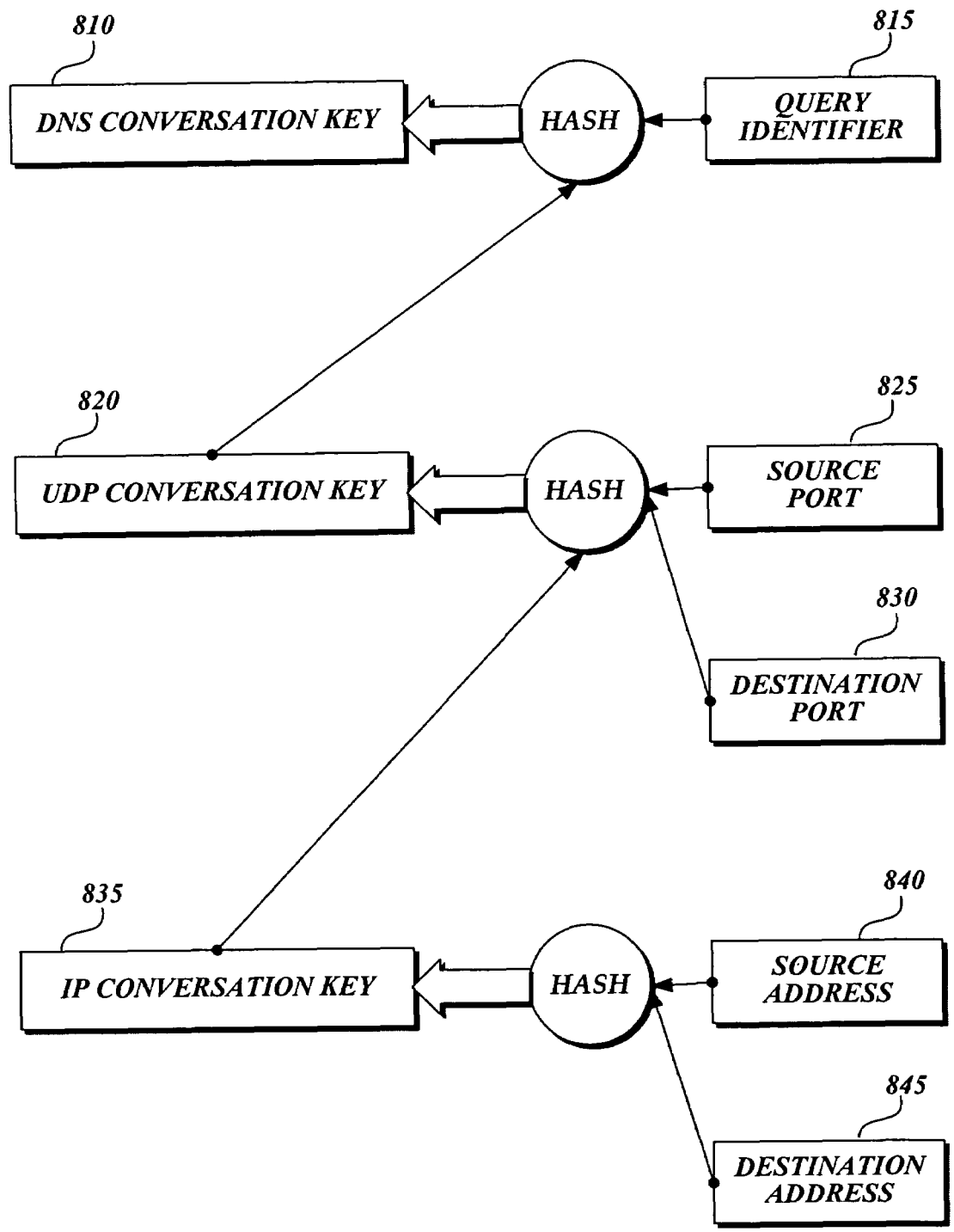
FIG. 8 is a diagram of exemplary hash keys that identify conversations.

FIG. 8 shows how three exemplary conversation keys are generated from information in three protocol layers of an exemplary frame. In the IP protocol layer, the Source Address 840 and Destination Address 845 are in frames exchanged between two computers. For example, one computer has address 192.20.7.2 and the other computer has address 192.20.7.8. In a frame exchanged between the two computers, both addresses are present and either address could be the Source Address 840 or the Destination Address 845. Since both addresses are present in frames exchanged between the two computers, the presence of both addresses in a frame identifies the frame as a frame in a conversation between the two computers. Submitting the Source Address 840 and the Destination Address 845 to a hashing function generates an IP Conversation Key 835 that is unique to the conversation between the two computers. In a similar way, in the UDP protocol layer, the Source Port 825 and Destination Port 830 are included in frames exchanged between the two computers. However, the Source Port 825 and Destination Port 830 may be used in other conversations involving other computers. Therefore, when generating the UDP Conversation Key 820, not only are the Source Port 825 and Destination Port 830 submitted to the hashing function, the IP Conversation Key 835 is also submitted to the hashing function. Since the IP Conversation Key 835 uniquely identifies conversations between the two computers, the hashing of the IP Conversation Key 835 with the Source Port 825 and Destination Port 830 uniquely identifies conversations in the UDP protocol layer on the two computers that also use the Source Port 825 and Destination Port 830. Using a method similar to the method described for the IP and UDP protocol layers, the UDP Conversation Key 820 is hashed together with the Query Identifier 815 in the DNS protocol layer to generate a unique DNS Conversation Key 810. Note that the order of unique identifiers matters when hashing. For example, given unique identifiers A and B, hashing identifier A with identifier B results in a different hash value than hashing B with A.

Threading conversations, described above, is a filtering technique used to enable extracting patterns of information in frames in a network data stream. FIG. 5 illustrates another filtering technique, parser optimization, can be used to speed up the capture of frames. In FIG. 5 a filter 390 is used by the parser optimizer 385 to generate an optimized parser 400. An optimized parser 400 instructs the capture engine 320 to skip over the data structures in a frame that are not of interest and focus on the data structures in the frame that are of interest. Such filtering results in capture engine 320 sending the parser engine 330 only the data structures of interest to the parser engine 330, thereby saving time and memory.

Figure 10:
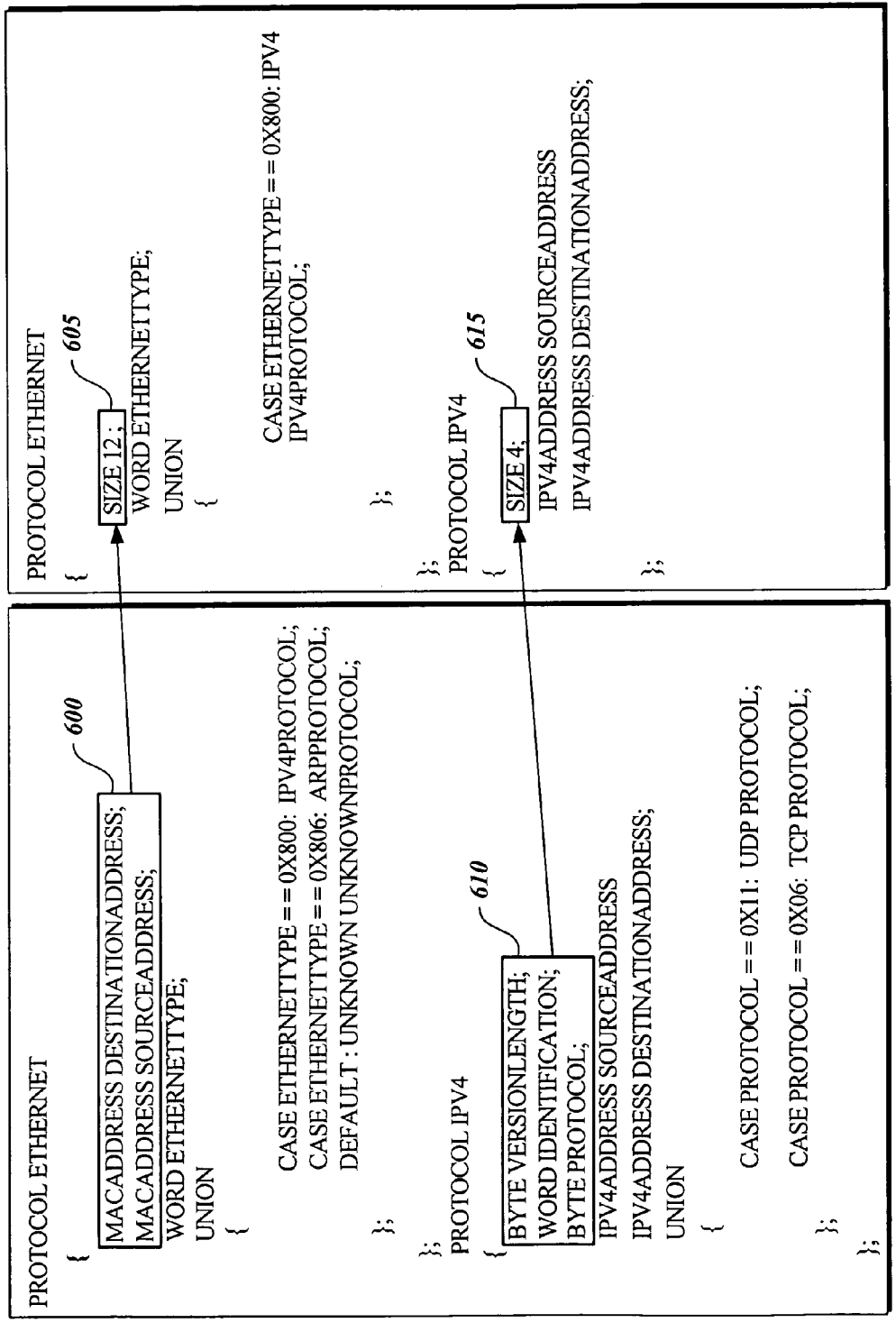
FIG. 10 is an example of how a portion of an exemplary parser script is optimized.

An example of the foregoing parser optimization filtering technique is illustrated in FIG. 10. In FIG. 10, a portion of a normal, i.e., unoptimized script, is shown in the left panel and an example of the optimized version of the portion of the script is shown in the right panel. It can be seen that the two lines "MACADDRESS DESTINATIONADDRESS;" and "MACADDRESS SOURCEADDRESS;" 600 in the left panel are replaced by a size specification "SIZE 12" 605 in the right panel. The size specification 605 specifies the number of bytes used by the source address and destination address. Those skilled in the are will appreciate that "MACADDRESS" refers to a Media Access Control (MAC) address, i.e., an address in the Ethernet protocol layer that uniquely identifies the physical device containing the MAC address. Also in FIG. 10, the three lines "BYTE VERSIONLENGTH;", "WORD IDENTIFICATION;", and "BYTE PROTOCOL;" 610 are replaced by a size specification "SIZE 4" 615 in the right panel. The parser engine 330 passes the optimized script, i.e., the script in the right panel, to the capture engine. The capture engine reads the optimized script. Instead of taking time and memory to explicitly collect, for example, a destination address and a source address, the capture engine can skip 12 bytes and go directly to capturing the next item, "WORD ETHERNETTYPE". In this way, the capture engine captures a frame without spending time on details of data structures.

Certain data structures may not be able to be described in the language that describes network protocols, i.e., the Netmon Parser Language (NPL). For example, strings rely on pointers and a network protocol language may not include a way to represent pointers. Data structures that are not represented in the language, such as strings, can be parsed by using DLL parser functions called from within the script. A parser function called DNSString is used to call a DLL to get the length of a DNS string and extract the DNS string.

Preferably the parser engine 330 (FIG. 5) conducts safety and security checks such as, checking the length of data structures, checking for possible buffer overruns, validating data before attempting to parse the data, and so on. Because script is used to describe protocols, the script may be customized to cause the capture engine to extract more or less data from the network data stream. For example, an information technology administrator can write multiple scripts customized to the various needs of administered intranets. It should also be noted that the payload of the frame may also be parsed if the script is modified to specify the format of the payload in a particular kind of frame. For example, the frames in an email application may have client-server commands that can be parsed if the script describes the schema for the client-server commands.

Preferably the parser engine 330 (FIG. 5) is able to parse externally described protocols and "self-describing" protocols. Externally described protocols have a fixed set of fields. The field values are included in the frame data. The field names are predefined and not included in the frame data. The position of a byte or block of bytes in a frame using an externally described protocol determine the field to which the bytes belong. Ethernet is an example of an externally described protocol. In Ethernet the position of the bytes indicate the field to which the bytes belong. For example, those skilled in the art will appreciate that the first six bytes of an Ethernet frame are the MacAddress destination and the next six bytes are the MacAddress source.

A "self-describing" protocol is a protocol that provides protocol structure information within frame data. Instead of explicitly predefining each field delimiters and delimiting rules are predefined to enable a parser to identify blocks of data as field names and field values. Field names with associated field values are not required to be a particular order. A field name with associated field value may be added or removed. HTTP is an example of a self-describing protocol. An exemplary self-describing protocol frame data block is represented by the text string "Host:\swww.microsoft.com\r\nProxy:\sitgproxy\r\n." "Host" is the name of the field. ":\s," i.e., a colon and space, separates the field name "Host" from the field value "www.microsoft.com." "\r\n," i.e., a carriage return and newline, terminates the field name/value pair. "Proxy" is the name of the next field. ":\s" separates the field name "Proxy" from the field value "itgproxy." "\r\n" terminates the field name/value pair. The order of the name/value pairs may be reversed. Either of the name/value pairs may be removed. One or more similarly delimited name/value pairs may be included. Preferably the parser engine 330 (FIG. 5) extracts name/value pairs and constructs field names with associated field values in a protocol parser, e.g., an HTTP protocol parser. A field value of a previously defined field name replaces the field value of the field name. In this way a network monitor is able to recognize fields not originally defined a protocol parser, add the fields to a protocol parser, and present the fields to a user. A user may then include the fields in a filter,e.g., an NPL script.

While the preferred embodiment of the invention has been illustrated and described, it will be appreciated that various changes can be made therein without departing from the spirit and scope of the invention as defined by the appended claims. For example, protocols other than the industry standard protocols may be inserted into a script. Another example of a change that may be made without departing from the spirit and scope of the invention is that a script can be used to change the format of the output.

The embodiments of the invention in which an exclusive property or privilege is claimed are defined as follows:

1. A method of analyzing a network data stream comprising: capturing frames from a network data stream; parsing said captured frames using a protocol parser having a data structure, stored on a computer-readable medium, that includes a data type that identifies the protocol to generate parsed frames, wherein the protocol parser is created by interpreting a script that describes the format of the protocol and that is written in a language describing network protocols; organizing said parsed frames into conversations; and substituting a data structure size in said protocol parser for a selected data structure.

2. The method of analyzing a network data stream claimed in claim 1 wherein said protocol parser is stored in memory.

3. The method of analyzing a network data stream claimed in claim 1 including a plurality of protocol parsers, each of said protocol parsers created by interpreting script written in a language describing network protocols.

4. The method of analyzing a network data stream claimed in claim 1 including debugging said interpreted script to determine if said script has errors.

5. The method of analyzing a network data stream as claimed in claim 1 wherein said data structure of said protocol parser includes at least two data fields, one field for holding data that identifies the description of a data type and another field for holding data that identifies the source of a data type.

6. A method of creating protocol parsers for use in analyzing network data streams comprising: interpreting script that describes the format of a protocol and is written in a language describing network protocols; using said script interpretations to create protocol parsers, wherein each of the protocol parsers has a data structure that includes a data type that identifies the protocol, wherein each data type include an identification field that includes data that allows a parser engine to identify the data type of the protocol and a size field that indicates the size of the memory the related protocol occupies during usage; and storing said protocol parsers in memory.

7. The method of creating protocol parsers claimed in claim 6, wherein each data type includes a Name field that identifies the name of the protocol parser and DataField list field that identifies at least two data fields, one of said data fields including data that identifies the destination address of messages employing the related protocol and the other of said data fields including data that identifies the source of messages employing the related protocol.

8. The method of creating protocol parsers claimed in claim 7 wherein said at least two data fields also include an identification (ID) field that identifies the data type; a size field that includes data that denotes the size of the data type; a datatype field that includes data that identifies the datatype; and a Next field that includes data that identifies the next data field.

9. A computer-readable medium, including computer-executable instructions that, when executed, cause a computing device to: interpret script that describes the format of the protocol and that is written in a language describing network protocols to build at least one protocol parser wherein the at last one protocol parser has a data structure that includes a data type that identifies the protocol; store said protocol parser in memory; monitor a network data stream; capture frames from said network data stream; parse said captured frames using said protocol parsers; organize said parsed frames into conversations; and substitute data structure sizes for predetermined data in said protocol parser.

10. Computer-readable medium as claimed in claim 9 wherein said captured frames are nested from lower to higher order protocols.

11. Computer-readable medium as claimed in claim 10 wherein said plurality of protocols have hierarchical order.

12. Computer-readable medium as claimed in claim 9, wherein the data type includes a Name field that identifies the name of the protocol parser and DataField list field that identifies at least two data fields, one of said data fields including data that identifies the destination address of messages employing the related protocol and the other of said data fields including data that identifies the source of messages employing the related protocol.

* * * * *